(12) United States Patent
Hwang et al.

(10) Patent No.: US 10,199,644 B2
(45) Date of Patent: Feb. 5, 2019

(54) LITHIUM SECONDARY BATTERY

(71) Applicant: SK INNOVATION CO., LTD., Seoul (KR)

(72) Inventors: Duck-Chul Hwang, Suwon-si (KR); Kyung-Bin Yoo, Daejeon (KR); Kook-Hyun Han, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 402 days.

(21) Appl. No.: 14/982,516

(22) Filed: Dec. 29, 2015

(65) Prior Publication Data

US 2016/0190567 A1   Jun. 30, 2016

(30) Foreign Application Priority Data

Dec. 30, 2014   (KR) .................. 10-2014-0193164

(51) Int. Cl.
   *H01M 4/36*   (2006.01)
   *H01M 4/525*   (2010.01)
   *H01M 4/505*   (2010.01)
   *H01M 4/587*   (2010.01)
   *H01M 10/0525*   (2010.01)
   *H01M 4/02*   (2006.01)

(52) U.S. Cl.
   CPC .......... *H01M 4/366* (2013.01); *H01M 4/364* (2013.01); *H01M 4/505* (2013.01); *H01M 4/525* (2013.01); *H01M 4/587* (2013.01); *H01M 10/0525* (2013.01); *H01M 2004/021* (2013.01); *H01M 2004/027* (2013.01); *H01M 2004/028* (2013.01); *H01M 2220/20* (2013.01); *H01M 2220/30* (2013.01); *Y02E 60/122* (2013.01); *Y02T 10/7011* (2013.01)

(58) Field of Classification Search
   CPC ...... H01M 4/366; H01M 4/364; H01M 4/525; H01M 4/505; H01M 4/587; H01M 10/0525; H01M 2004/028; H01M 2004/027; H01M 2004/021; H01M 2220/20; H01M 2220/30; Y02E 60/122
   See application file for complete search history.

(56) References Cited

U.S. PATENT DOCUMENTS 7,718,307 B2   5/2010   Shimizu et al.
2006/0127771 A1*   6/2006   Yamaki ............... H01M 4/366
                                                        429/231.8

(Continued)

FOREIGN PATENT DOCUMENTS

CN           1947286 A      4/2007
KR    1020060134631 A      12/2006
WO    WO 2013/183974   * 12/2013

*Primary Examiner* — Laura Weiner
(74) *Attorney, Agent, or Firm* — The Webb Law Firm (57) ABSTRACT

Disclosed is a lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the anode includes hard carbon having an average lattice distance ($d_{002}$) in the range of 3.6 to 3.8 Å and graphite having an average lattice distance ($d_{002}$) in the range of 3.356 to 3.360 Å, such that output and high-temperature storage properties may be improved.

9 Claims, 4 Drawing Sheets

(56) References Cited

U.S. PATENT DOCUMENTS

| | | | |
|---|---|---|---|
| 2009/0068561 A1* | 3/2009 | Sun | H01M 4/131 |
| | | | 429/223 |
| 2009/0068564 A1 | 3/2009 | Lee et al. | |
| 2010/0015514 A1 | 1/2010 | Miyagi et al. | |
| 2011/0052980 A1* | 3/2011 | Sakata | H01M 4/131 |
| | | | 429/199 |
| 2014/0087266 A1* | 3/2014 | Li | H01M 4/485 |
| | | | 429/231.3 |
| 2014/0158932 A1* | 6/2014 | Sun | H01M 4/13 |
| | | | 252/182.1 |
| 2015/0349381 A1* | 12/2015 | Hwang | H01M 10/0567 |
| | | | 429/188 |

* cited by examiner

LITHIUM SECONDARY BATTERY

CROSS-REFERENCE TO RELATED APPLICATIONS

This application claims priority to Korean Patent Application No. 10-2014-0193164 filed Dec. 30, 2014, the disclosure of which is hereby incorporated in its entirety by reference.

BACKGROUND OF THE INVENTION

Field of the Invention

The present invention relates to a lithium secondary battery, and more specifically, to a lithium secondary battery with excellent output and high-temperature storage properties and increased battery capacity.

Description of the Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes an anode made of a carbon material capable of absorbing and desorbing lithium ions, a cathode made of lithium-containing oxide, and a non-aqueous electrolyte containing lithium salt dissolved in a mixed organic solvent in a suitable amount.

In this regard, as the application of the lithium secondary battery is more enlarged, a case that the lithium secondary battery should be used even under more severe environments is increased.

However, lithium transition metal oxide or composite oxide used as a cathode active material of the lithium secondary battery entails a problem that a metal component is desorbed from the cathode during storage at a high temperature under fully charged condition, hence being in thermally unstable state.

In order to solve the above problem, Korean Patent Laid-Open Publication No. 2006-0134631 discloses a cathode active material of core-shell structure having a core part and a shell part which are made of lithium transition metal oxides different from each other, however, still has lack of improvement in life-span property.

SUMMARY OF THE INVENTION

Accordingly, it is an object of the present invention to provide a lithium secondary battery with excellent output and high-temperature storage properties.

However, the technical problem to be solved by the present invention is not limited to the above-described problems, and those skilled in the related art should clearly understand other problems not described above and features of the present invention from the following detailed description.

(1) A lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the anode includes hard carbon having an average lattice distance ($d_{002}$) in the range of 3.6 to 3.8 Å and graphite having an average lattice distance ($d_{002}$) in the range of 3.356 to 3.360 Å.

(2) The lithium secondary battery according to the above (1), wherein another of the metals included in the lithium-metal oxide has a constant concentration between the core part and the surface part.

(3) The lithium secondary battery according to the above (1), wherein the lithium-metal oxide includes a first metal having a concentration gradient region with increased concentration between the core part and the surface part, and a second metal having a concentration gradient region with decreased concentration between the core part and the surface part.

(4) The lithium secondary battery according to the above (1), wherein the lithium-metal oxide is represented by Formula 1 below, wherein at least one of M1, M2 and M3 has a concentration gradient region between the core part and the surface part:

$$Li_xM1_aM2_bM3_cO_y \quad \text{[Formula 1]}$$

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0\leq a\leq1$, $0\leq b\leq1$, $0\leq c\leq1$, and $0<a+b+c\leq1$).

(5) The lithium secondary battery according to the above (4), wherein at least one of the M1, M2 and M3 has a concentration gradient region with increased concentration between the core part and the surface part, while the others have a concentration gradient region with decreased concentration between the core part and the surface part.

(6) The lithium secondary battery according to the above (4), wherein at least one of the M1, M2 and M3 has a concentration gradient region with increased concentration between the core part and the surface part, another has a concentration gradient region with decreased concentration between the core part and the surface part, and the other has a constant concentration between the core part and the surface part.

(7) The lithium secondary battery according to the above (4), wherein the M1, M2 and M3 are Ni, Co and Mn, respectively.

(8) The lithium secondary battery according to the above (4), wherein the M1 is Ni, and $0.6\leq a\leq0.95$ and $0.05\leq b+c\leq0.4$.

(9) The lithium secondary battery according to the above (4), wherein the M1 is Ni, and $0.7\leq a\leq0.9$ and $0.1\leq b+c\leq0.3$.

(10) The lithium secondary battery according to the above (1), wherein the lithium-metal oxide has a primary particle of a rod-type shape.

(11) The lithium secondary battery according to the above (1), wherein a mixing weight ratio of the hard carbon and the graphite is 1:99 to 99:1.

(12) The lithium secondary battery according to the above (1), wherein a mixing weight ratio of the hard carbon and the graphite is 5:95 to 70:30.

The lithium secondary battery of the present invention uses the non-aqueous electrolyte that includes a cathode active material containing a metal with a concentration gradient, and a specific additive, such that it is possible to achieve a significantly improved effect in both of the high-temperature storage and lifespan properties.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention discloses a lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the anode includes hard carbon having an average lattice distance ($d_{002}$) in the range of 3.6 to 3.8 Å and graphite having an average lattice distance ($d_{002}$) in the range of 3.356 to 3.360 Å, such that output and high-temperature storage properties may be improved.

Hereinafter, exemplary embodiments of the present invention will be described in detail with reference to the accompanying drawings.

Cathode Active Material

The cathode active material according to the present invention includes lithium-metal oxide of which at least one of metals has a concentration gradient between a core part and a surface part thereof. Such a cathode active material exhibits superior life-span property, compared to a cathode active material without a change in concentration.

In the present invention, the fact that the metal of the lithium-metal oxide has a concentration gradient region between the core part and the surface part, means that other metals except for lithium may have a concentration distribution region varying in a constant tendency between a core part and a surface part of a lithium-metal oxide particle. The concentration distribution region (that is, concentration gradient region) may be positioned at any portion between the core part and the surface part, without particular limitation thereof. The constant tendency means that a development of concentration change is decreased or increased, however, does not exclude that a value opposed to the above tendency may be represent at a position. In the present invention, the core part of the particle means an area within 0.1 μm radius from a center of the active material particle, while the surface part means an area within 0.1 μm from the outmost portion of the particle.

The cathode active material according to the present invention may include at least one of metals having a concentration gradient. Therefore, as one embodiment, the cathode active material may include a first metal having a concentration gradient region with increased concentration between the core part and the surface part, and a second metal having a concentration gradient region with decreased concentration between the core part and the surface part. The first metal or second metal may be independently at least one of metals.

As another embodiment of the present invention, the cathode active material according to the present invention may include a metal having a constant concentration between the core part and the surface part.

A specific example of the cathode active material according to the present invention may include lithium-metal oxide represented by Formula 1 below, wherein at least one of M1, M2 and M3 has a concentration gradient between the core part and the surface part:

$$Li_xM1_aM2_bM3_cO_y$$ [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B; and $0<x\leq1.1$, $2\leq y\leq2.02$, $0\leq a\leq1$, $0\leq b\leq1$, $0\leq c\leq1$, and $0<a+b+c\leq1$).

According to one embodiment of the present invention, at least one of M1, M2 and M3 may have a concentration gradient region with increased concentration between the core part and the surface part, while the others may have a concentration gradient region with decreased concentration between the core part and the surface part.

According to another embodiment of the present invention, at least one of M1, M2 and M3 may have a concentration gradient region with increased concentration between the core part and the surface part, another may have a concentration gradient region with decreased concentration between the core part and the surface part, and the other may have a constant concentration between the core part and the surface part.

According to a specific example of the present invention, M1, M2 and M3 may be Ni, Co and Mn, respectively.

The lithium-metal oxide according to the present invention may have a relatively higher content of Ni. Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may express excellent life-span property while maintaining a high capacity. For example, with regard to the lithium-metal oxide according to the present invention, a molar ratio of nickel may range from 0.6 to 0.95, and preferably, 0.7 to 0.9. That is, if M1 is Ni in the above Formula 1, it may be $0.6\leq a\leq0.95$ and $0.05\leq b+c\leq0.4$, and preferably, $0.7\leq a\leq0.9$ and $0.1\leq b+c\leq0.3$.

A particle shape of the lithium-metal oxide according to the present invention is not particularly limited, but a primary particle thereof preferably has a rod-type shape.

A particle size of the lithium-metal oxide according to the present invention is not particularly limited, and may be a range of 3 to 25 μm, for example.

The cathode active material according to the present invention may further include a coating layer on the above-described lithium-metal oxide. The coating layer may be made of a metal or metal oxide including, for example, Al, Ti, Ba, Zr, Si, B, Mg and P, and alloys thereof or oxides of the above metal.

As necessary, the cathode active material according to the present invention may include a configuration in which the above-described lithium-metal oxide is doped with a metal. Such a doping metal may include, for example, Al, Ti, Ba, Zr, Si, B, Mg, P, V, W, or the like, which may be used alone or in combination of two or more thereof.

The lithium-metal oxide according to the present invention may be prepared by co-precipitation.

Hereinafter, a method for preparing a cathode active material according to one embodiment of the present invention will be described.

First, a metal salt aqueous solution for forming a core part is prepared, and then, a metal salt aqueous solution for forming a surface part is prepared. Next, the metal salt aqueous solution for forming a core part is mixed with the metal salt aqueous solution for forming a surface part according to a required concentration gradient, and a chelating agent and an alkaline aqueous solution are mixed in a reactor, so as to prepare a precipitate having a concentration gradient of at least one metal element between the core part and the surface part.

After the prepared precipitate is subjected to heat treatment, if it is mixed with a lithium salt and the mixture is again subjected to heat treatment, a cathode active material according to the present invention may be obtained.

Anode Active Material

The anode active material includes hard carbon having an average lattice distance ($d_{002}$) in the range of 3.6 to 3.8 Å and graphite having an average lattice distance ($d_{002}$) in the range of 3.356 to 3.360 Å.

When using a mixture of graphite having an average lattice distance ($d_{002}$) within a specific range as the anode active material together with the cathode active material of the present invention, the lithium secondary battery of the present invention may have significantly improved output and high-temperature storage properties.

If using only hard carbon having an average lattice distance ($d_{002}$) in the range of 3.6 to 3.8 Å, battery capacity may be significantly decreased, while if using only graphite having an average lattice distance ($d_{002}$) in the range of 3.356 to 3.360 Å, high-temperature storage property may be significantly decreased.

In addition, if the average lattice distance ($d_{002}$) of hard carbon is less than 3.6 Å or exceeds 3.8 Å, a hard carbon structure may not be formed.

Further, if the average lattice distance ($d_{002}$) of graphite is less than 3.356 Å, a graphite structure may not be formed, and if it exceeds 3.360 Å, output may be decreased.

A mixing weight ratio of the hard carbon having an average lattice distance ($d_{002}$) in the range of 3.6 to 3.8 Å and graphite having an average lattice distance ($d_{002}$) in the range of 3.356 to 3.360 Å may be 1:99 to 99:1, and preferably, 5:95 to 70:30 in consideration of the battery capacity.

A size of the graphite used in the present invention is not particularly limited, but may have an average particle diameter of 5 to 30 µm.

As necessary, the anode active material according to the present invention may include any material known in the related art, so long as it can absorb and desorb lithium ions within a range without detriment to the effects of the present invention, without particular limitation thereof. For example, carbon materials such as crystalline carbon, amorphous carbon, carbon composite, carbon fiber, etc., lithium metal, alloys of lithium and other elements, silicon, or tin may be used. Other elements used together with lithium to form an alloy thereof may include, for example, aluminum, zinc, bismuth, cadmium, antimony, silicone, lead, tin, gallium or indium.

Secondary Battery

The present invention provides a lithium secondary battery fabricated using a cathode containing the above-described cathode active material, an anode containing the above-described anode active material, and the above-described non-aqueous electrolyte.

The cathode may be formed by adding a solvent and, optionally, a binder, conductive material, dispersant, etc. to the cathode active material, and agitating the same to prepare a cathode slurry, then applying (coating) the slurry to a collector made of a metal material, and drying and pressing the same.

The anode may be formed by adding a solvent and, optionally, a binder, conductive material, dispersant, etc. to the anode active material and agitating the same to prepare an anode negative slurry, applying the slurry to a collector made of a metal material (coating), drying and pressing the same.

The binder may include any one commonly used in the related art without particular limitation thereof. For example, an organic binder such as vinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is a metal having high conductivity and being easily attached with a mixture of the cathode or anode active material. The metal used herein may include any one if it does not have reactivity in the voltage range of the battery. A non-limited example of the cathode active material may include a foil made of aluminum, nickel, or a combination thereof. A non-limited example of the anode active material may include a foil made of copper, gold, nickel or a copper alloy, or a combination thereof.

A separator may be present between the cathode and the anode. Such a separator may be made of a conventional porous polymer film typically used as a separator in the related art, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, typical porous woven fabrics, for example, a woven fabric made of high-melting point glass fiber, polyethylene terephthalate fiber, etc., may be used, but it is not particularly limited thereto. The separator may be applied to a battery by any general method such as winding. Besides, lamination (stacking) and folding of the separator and the electrode may also be used.

The non-aqueous electrolyte may include lithium salt which is an electrolyte and an organic solvent.

The lithium salt may include any one typically used for a lithium secondary battery electrolyte without particular limitation thereof, and may be represented by $Li^+X^-$. Anions of such a lithium salt are not particularly limited, but may include for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, which may be used alone or in combination of two or more thereof. The organic solvent may include any one typically used for the lithium secondary battery electrolyte without particular limitation thereof. Representative examples may include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, ethyl propionate, ethyl acetate, propyl acetate, dimethyl sulfoxide, acetonitrile, dimethoxyethane, diethoxyethane, sulforane, γ-butyrolactone and tetrahydrofurane, or a mixture of two or more thereof.

The non-aqueous electrolyte may optionally further include any additive known in the related art without particular limitation thereof. For example, at least one of vinylene carbonate, propylene sulfite, propene sultone, propane sultone, etc. may be included, but it is not particularly limited thereto.

The above-described non-aqueous electrolyte for a lithium secondary of the present invention may be introduced into an electrode structure including a cathode, an anode, and a separator installed between the cathode and the anode, so as to fabricate a lithium secondary battery. An appearance of the lithium secondary battery of the present invention is not particularly limited, but may include, for example, a cylindrical or square form using a can, a pouch type or a coin type. Hereinafter, preferred embodiments are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Example 1

<Cathode>

Lithium-metal oxide (hereinafter, CAM-10) with a whole composition of $LiNi_{0.80}Co_{0.10}Mn_{0.10}O_2$, a core part composition of $LiNi_{0.83}Co_{0.10}Mn_{0.07}O_2$ and a surface part composition of $LiNi_{0.78}Co_{0.10}Mn_{0.12}O_2$, having a concentration gradient region of nickel and manganese at a middle portion between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

Figure 1:
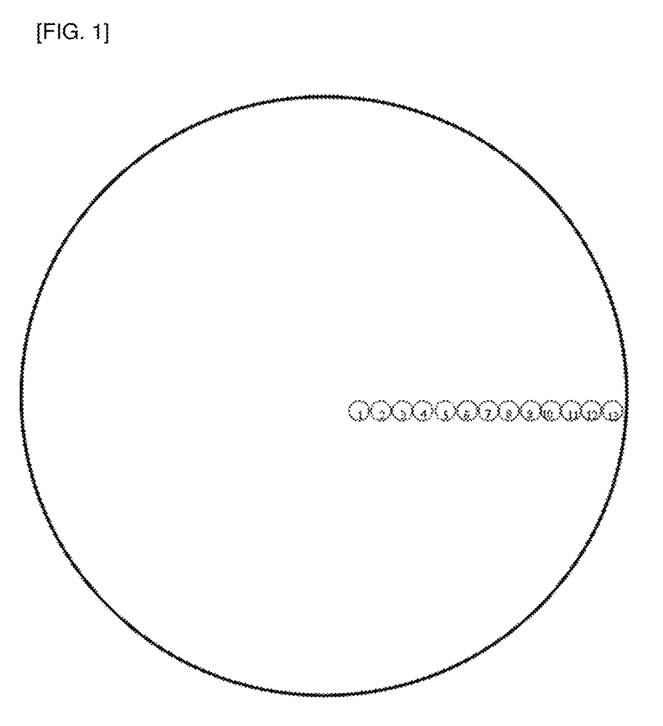
FIG. 1 is a view schematically illustrating a site of measuring a concentration of metal elements included in lithium-metal oxide according to an embodiment of the present invention.

For reference, the concentration gradient of the lithium-metal oxide used herein is listed in Table 1, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 1

| Site | Ni | Co | Mn |
|---|---|---|---|
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |

TABLE 1-continued

| Site | Ni | Co | Mn |
|---|---|---|---|
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

<Anode>

An anode slurry including 93 wt. % of a mixture (see mixing weight ratios in Table 2) of hard carbon ($d_{002}$ 3.7 Å, hereinafter HC01) and a graphite ($d_{002}$ 3.358 Å) as an anode active material, 5 wt. % of a flake type conductive material, that is, KS6 as a conductive material, 1 wt. % of SBR as a binder, and 1 wt. % of CMC as a thickener was applied to a copper substrate, followed by drying and pressing to prepare an anode.

<Battery>

By notching both of a cathode plate and an anode plate in a suitable size, respectively, laminating the same, and installing a separator (polyethylene with a thickness of 25 μm) between the cathode plate and the anode plate, a cell was fabricated. Tap parts of the cathode and the anode were welded, respectively. A combination of the welded cathode/separator/anode was put into a pouch, followed by sealing three sides of the pouch except one side into which an electrolyte is injected. In this case, a portion having the tap is included in the sealing portion. After injecting the electrolyte through the remaining one side, the one side was also sealed, followed by impregnation for 12 hours or more. The electrolyte used herein was formed by preparing 1M $LiPF_6$ solution with a mixed solvent of EC/EMC/DEC (25/45/30; volume ratio), and adding 1 wt. % of vinylene carbonate (VC), 1 wt. % of 1,3-propene sultone (PRS), and 0.5 wt. % of lithium bis(oxalato)borate (LiBOB) thereto.

After then, pre-charging was conducted with a current (2.5 A) corresponding to 0.25 C for 36 minutes. After 1 hour, degassing and then aging were conducted for 24 hours or more, followed by chemical charging/discharging (charge condition: CC-CV 0.2 C 4.2 V 0.05 C CUT-OFF; discharge condition: CC 0.2 C 2.5 V CUT-OFF). Thereafter, standard charging/discharging was conducted (charge condition: CC-CV 0.5 C 4.2 V 0.05 C CUT-OFF; discharge condition: CC 0.5 C 2.5 V CUT-OFF).

Examples 2 to 5

The same procedures as described in Example 1 were conducted to fabricate cells except that mixing weight ratios of a mixture of hard carbon ($d_{002}$ 3.7 Å) and a graphite ($d_{002}$ 3.358 Å) as an anode active material were applied as shown in Table 3 below.

Example 6

<Cathode>

Lithium-metal oxide (hereinafter, CAM-20) with a whole composition of $LiNi_{0.80}Co_{0.11}Mn_{0.09}O_2$, a core part composition of $LiNi_{0.802}Co_{0.11}Mn_{0.088}O_2$ and a surface part composition of $LiNi_{0.77}Co_{0.11}Mn_{0.12}O_2$, having a concentration gradient region of nickel and manganese at the surface part between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

For reference, the concentration gradient of the lithium-metal oxide used herein is listed in Table 2 below, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 2

| Site | Ni | Co | Mn |
|---|---|---|---|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 13 | 0.770 | 0.110 | 0.120 |

The other processes were substantially the same as those described in Example 1.

Examples 7 to 10

The same procedures as described in Example 6 were conducted to fabricate cells except that mixing weight ratios of a mixture of HC01 and GRAPHITE01 as an anode active material were applied as shown in Table 3 below.

Examples 11 to 14

The same procedures as described in Example 3 were conducted to fabricate cells except that HC02 (hard carbon $d_{002}$=3.6 Å) (Example 11) and HC03 (hard carbon $d_{002}$=3.8 Å) (Example 12) were used instead of HC01, respectively; and GRAPHITE02 (graphite $d_{002}$=3.356 Å) (Example 13) and GRAPHITE03 (graphite $d_{002}$=3.360 Å) (Example 14) were used instead of GRAPHITE01, respectively.

Comparative Examples 1 to 5

The same procedures as described in each of Examples 1 to 5 were conducted to fabricate cells except that $LiNi_{0.8}Co_{0.1}Mn_{0.1}O_2$ (hereinafter, NCM811) having a uniform composition throughout particles without a concentration gradient was used as a cathode active material.

Comparative Examples 6 and 7

The same procedures as described in Example 1 were conducted to fabricate cells except that GRAPHITE01 was used alone (Comparative Example 6), and HC01 was used alone (Comparative Example 7) as an anode active material, respectively.

Comparative Examples 8 and 9

The same procedures as described in Comparative Example 1 were conducted to fabricate cells except that GRAPHITE01 was used alone (Comparative Example 8) and HC01 was used alone (Comparative Example 9) as an anode active material, respectively.

Example 10

The same procedures as described in Example 3 were conducted to fabricate a cell except that GRAPHITE04 (graphite $d_{002}$=3.363 Å) was used instead of GRAPHITE01 as an anode active material.

Experimental Example

1. Output Property
Hybrid pulse power characterization (HPPC) test procedures were performed in accordance with FreedomCar Battery Test Manual using the cells prepared in the examples and comparative examples to measure output properties thereof, and the results thereof are listed in Table 3 below.
2. High Temperature Storage Property (Capacity Recovery Rate after 4 Weeks)
After storing the cell charged by SOC100 (1 C 4.2 V 0.1 C CUT-OFF) according to each of the examples and comparative example in an oven at 60° C. for 4 weeks, the cell was further stored under the same condition of 10 for 12 hours or more at room temperature, and then a recovery discharge capacity was measured. The results thereof are listed in Table 3 below.

TABLE 3

| Section | Cathode active material | Anode active material Type | Mixing weight ratio | Anode capacity (mAh/g) | Output (W/kg) | Capacity recovery rate after high-temperature storage for 4 weeks (%) |
|---|---|---|---|---|---|---|
| Example 1 | CAM-10 | GRAPHITE 01/HC01 | 95/5 | 347 | 3140 | 82.8 |
| Example 2 | CAM-10 | GRAPHITE 01/HC01 | 90/10 | 343 | 3420 | 84.4 |
| Example 3 | CAM-10 | GRAPHITE 01/HC01 | 60/40 | 322 | 3710 | 86.6 |
| Example 4 | CAM-10 | GRAPHITE 01/HC01 | 30/70 | 301 | 3720 | 87.4 |
| Example 5 | CAM-10 | GRAPHITE 01/HC01 | 10/90 | 287 | 3910 | 90.1 |

TABLE 3-continued

| Section | Cathode active material | Anode active material Type | Mixing weight ratio | Anode capacity (mAh/g) | Output (W/kg) | Capacity recovery rate after high-temperature storage for 4 weeks (%) |
|---|---|---|---|---|---|---|
| Example 6 | CAM-20 | GRAPHITE 01/HC01 | 95/5 | 347 | 3150 | 83.2 |
| Example 7 | CAM-20 | GRAPHITE 01/HC01 | 90/10 | 343 | 3420 | 84.9 |
| Example 8 | CAM-20 | GRAPHITE 01/HC01 | 60/40 | 322 | 3730 | 87.3 |
| Example 9 | CAM-20 | GRAPHITE 01/HC01 | 30/70 | 301 | 3740 | 89.4 |
| Example 10 | CAM-20 | GRAPHITE 01/HC01 | 10/90 | 287 | 3918 | 90.2 |
| Example 11 | CAM-10 | GRAPHITE 01/HC02 | 60/40 | 322 | 3700 | 86.5 |
| Example 12 | CAM-10 | GRAPHITE 01/HC03 | 60/40 | 322 | 3720 | 87 |
| Example 13 | CAM-10 | GRAPHITE 02/HC01 | 60/40 | 322 | 3705 | 86.8 |
| Example 14 | CAM-10 | GRAPHITE 03/HC01 | 60/40 | 322 | 3715 | 86.5 |
| Comparative Example 1 | NCM811 | GRAPHITE 01/HC01 | 95/5 | 347 | 3100 | 81.1 |
| Comparative Example 2 | NCM811 | GRAPHITE 01/HC01 | 90/10 | 343 | 3290 | 83.2 |
| Comparative Example 3 | NCM811 | GRAPHITE 01/HC01 | 60/40 | 322 | 3480 | 84.3 |
| Comparative Example 4 | NCM811 | GRAPHITE 01/HC01 | 30/70 | 301 | 3620 | 85.2 |
| Comparative Example 5 | NCM811 | GRAPHITE 01/HC01 | 10/90 | 287 | 3905 | 87.0 |
| Comparative Example 6 | CAM-10 | GRAPHITE 01 | Used alone | 356 | 2790 | 74.5 |
| Comparative Example 7 | CAM-10 | HC01 | Used alone | 230 | 4050 | 92.5 |
| Comparative Example 8 | NCM811 | GRAPHITE 01 | Used alone | 356 | 2900 | 77.9 |
| Comparative Example 9 | NCM811 | HC01 | Used alone | 230 | 4085 | 89.2 |
| Comparative Example 10 | CAM-10 | GRAPHITE 04/HC01 | 60/40 | 320 | 3150 | 90 |

Referring to the above Table 3, it can be seen that the cells in the examples exhibit superior output and high-temperature storage (capacity recovery rate after high-temperature storage) properties, than those in the comparative examples.

Specifically, comparing Examples 1 to 10 with Comparative Examples 1 to 5, it can be seen that, when using the cathode active material according to the present invention, the output and high-temperature storage properties are superior to those of the comparative examples.

Further, from Comparative Examples 6 and 8 among the comparative examples using any one of anode active materials, it can be seen that the output and high-temperature storage properties are significantly decreased, and form Comparative Examples 7 and 9, anode capacity is very low in a level of 230 mAh/g, which is difficult to actually use as a battery.

Figure 2:
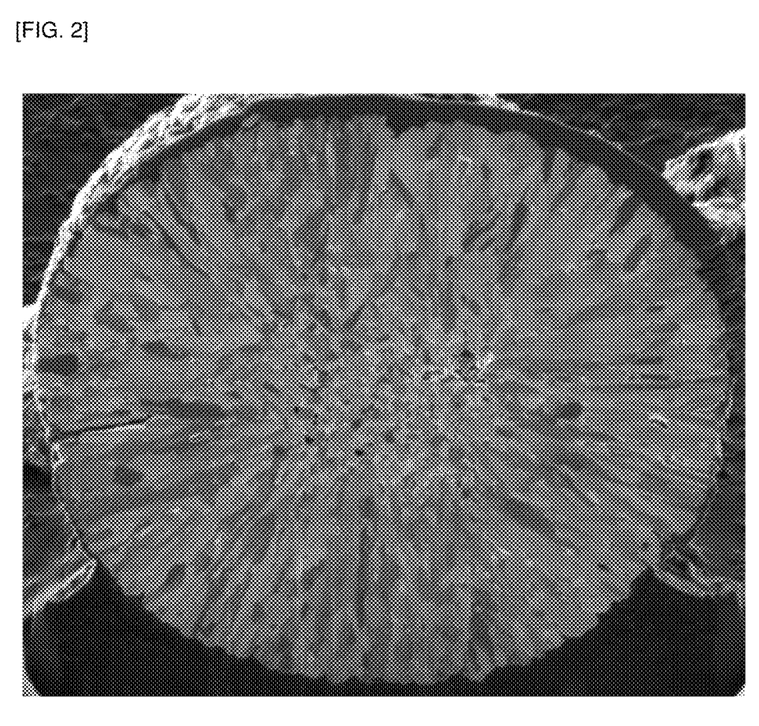
FIG. 2 is a photograph illustrating a cross section of a lithium-metal oxide according to Example 1.
Figure 3:
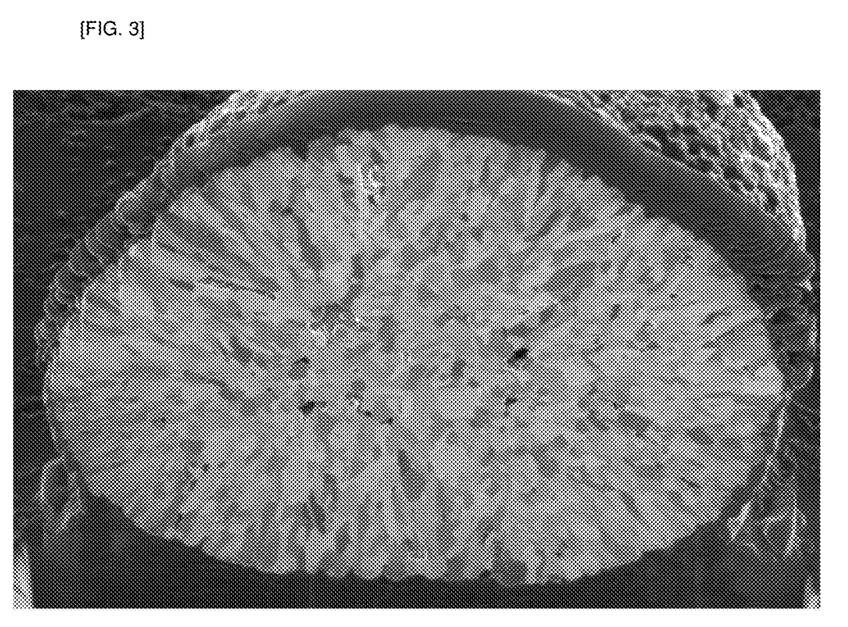
FIG. 3 is a photograph illustrating a cross section of a lithium-metal oxide according to Example 6.
Figure 4:
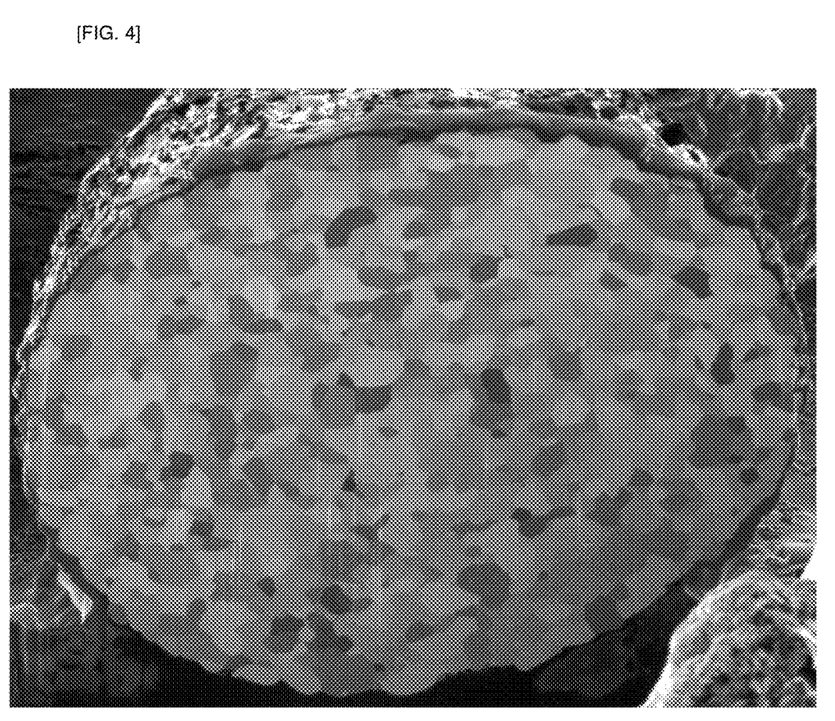
FIG. 4 is a photograph illustrating a cross section of a lithium-metal oxide according to Comparative Example 1.

Meanwhile, FIGS. 2, 3 and 4 illustrate cross-sectional images of the cathode active materials used in Examples 1 and 6, and Comparative Example 1, respectively. Referring to FIG. 2 (Example 1), FIG. 3 (Example 6) and FIG. 4 (Comparative Example 1), it can be seen that the primary particle of the cathode active material of the present invention used in Examples 1 and 6 has a rod-type shape, while the primary particle of the cathode active material of Comparative Example 1 has a shape close to a sphere.

Further, referring to FIGS. 2 and 3, it can be seen that the metal elements used for forming the cathode active materials prepared in Examples 1 and 6 have a concentration gradient, and the primary particle included in the cathode active material has a rod-type shape.

The invention claimed is:

1. A lithium secondary battery, comprising a cathode, an anode and a non-aqueous electrolyte,
    wherein the cathode includes a cathode active material containing lithium-metal oxide, the lithium metal oxide containing Ni, Co, and Mn, wherein at least one of Ni, Co, and Mn has a decreasing or increasing concentration gradient between a core part and a surface part thereof in a direction from the core part to the surface part, and
    the anode includes hard carbon having an average lattice distance ($d_{002}$) in the range of 3.6 to 3.8 Å and graphite having an average lattice distance ($d_{002}$) in the range of 3.356 to 3.360 Å.

2. The lithium secondary battery according to claim 1, wherein the concentration of Mn is increased between the core part and the surface part in the direction from the core part to the surface part, and the concentration of Ni is decreased between the core part and the surface part in the direction from the core part to the surface part.

3. The lithium secondary battery according to claim 1, wherein Co has a constant concentration throughout the cathode active material from the core part to the surface part.

4. The lithium secondary battery according to claim 1, wherein the lithium-metal oxide is represented by Formula 1 below, $$Li_xM1_aM2_bM3_cO_y,$$ [Formula 1]

wherein M1, M2 and M3 are Ni, Co, and Mn, respectively, and $0<x\leq1.1$, $2\leq y\leq2.02$, $0<a\leq1$, $0<b\leq1$, $0<c\leq1$, and $0<a+b+c\leq1$.

5. The lithium secondary battery according to claim 4, wherein $0.6\leq a\leq0.95$ and $0.05\leq b+c\leq0.4$.

6. The lithium secondary battery according to claim 4, wherein $0.7\leq a\leq0.9$ and $0.1\leq b+c\leq0.3$.

7. The lithium secondary battery according to claim 1, wherein the lithium-metal oxide has a primary particle of a rod-type shape.

8. The lithium secondary battery according to claim 1, wherein a mixing weight ratio of the hard carbon and the graphite is 1:99 to 99:1.

9. The lithium secondary battery according to claim 1, wherein a mixing weight ratio of the hard carbon and the graphite is 5:95 to 70:30.

* * * * *